(12) United States Patent
Brenner et al.

(10) Patent No.: US 6,896,000 B2
(45) Date of Patent: May 24, 2005

(54) CONTROL ELEMENT FOR THE SIMULTANEOUS CONTROL OF GASEOUS STREAMS

(75) Inventors: Frank Brenner, Remseck (DE); Georg Weber, Brackenheim-Stockheim (DE); Marc Bareis, Markgroeningen (DE); Peter Khatchikian, Cottbus (DE)

(73) Assignee: Robert Bosch GmbH, Stuttgart (DE)

( * ) Notice: Subject to any disclaimer, the term of this patent is extended or adjusted under 35 U.S.C. 154(b) by 23 days.

(21) Appl. No.: 10/275,880

(22) PCT Filed: Mar. 15, 2002

(86) PCT No.: PCT/DE02/00952

§ 371 (c)(1),
(2), (4) Date: May 9, 2003

(87) PCT Pub. No.: WO02/075124

PCT Pub. Date: Sep. 26, 2002

(65) Prior Publication Data

US 2003/0168116 A1 Sep. 11, 2003

(30) Foreign Application Priority Data

| Mar. 16, 2001 | (DE) | 101 12 819 |
| Jul. 5, 2001 | (DE) | 101 32 498 |
| Oct. 11, 2001 | (DE) | 101 50 170 |

(51) Int. Cl.$^7$ .................................................. F01N 3/00
(52) U.S. Cl. ............................ 137/597; 60/286; 60/301
(58) Field of Search ................................ 137/875, 597, 137/896; 60/286, 287, 288, 295, 301, 303

(56) References Cited

U.S. PATENT DOCUMENTS

| 5,406,790 | A | * | 4/1995 | Hirota et al. | 60/276 |
| 5,974,791 | A | * | 11/1999 | Hirota et al. | 60/276 |
| 6,647,710 | B2 | * | 11/2003 | Nishiyama et al. | 60/286 |
| 6,679,051 | B1 | * | 1/2004 | van Nieustadt et al. | 60/286 |
| 6,679,052 | B2 | * | 1/2004 | Nakatani et al. | 60/297 |

* cited by examiner

*Primary Examiner*—John Fox
(74) *Attorney, Agent, or Firm*—Ronald E. Greigg

(57) ABSTRACT

The invention relates to an apparatus for dividing an entering gas flow into two split flows, each of which flows through a branch of a line system. A control element is provided, which executes a control motion about a shaft between a first position and a second position. The entering gas flow is divided continuously, by means of the adjustable control element, at a volumetric flow ratio, and at the same time the control element allocates a medium to be metered, whose infeed point is associated with the control element, to the split flows at a different ratio $V_{DOS}$.

31 Claims, 10 Drawing Sheets

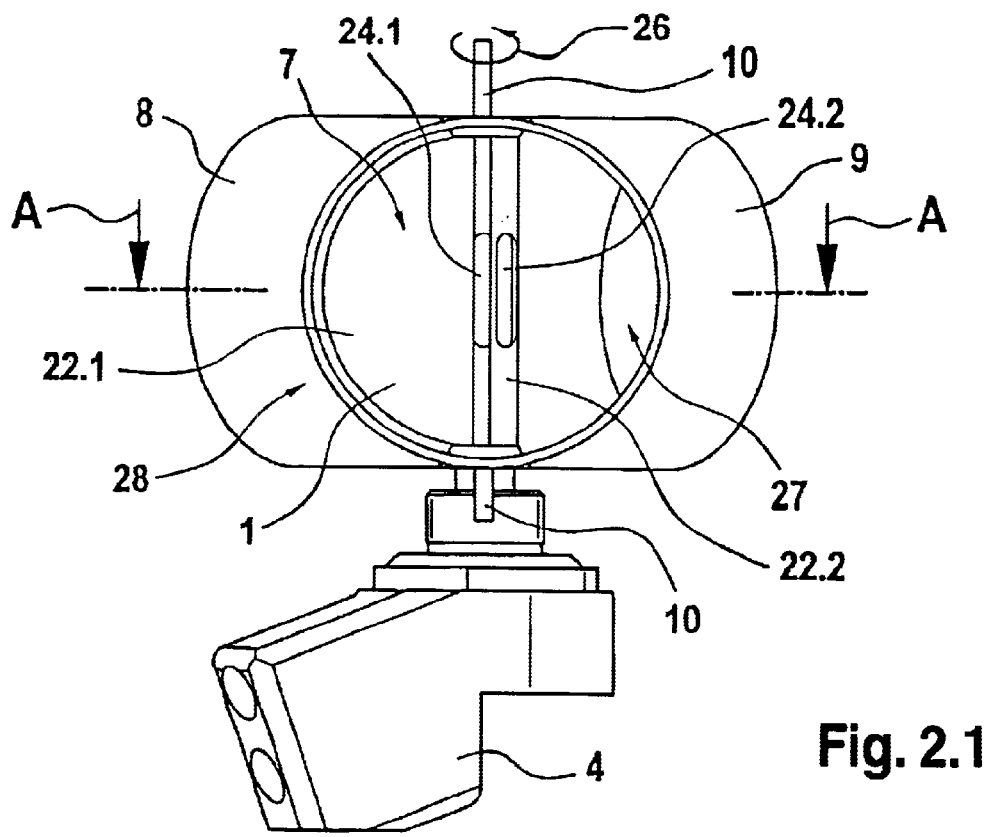
Fig. 2.1
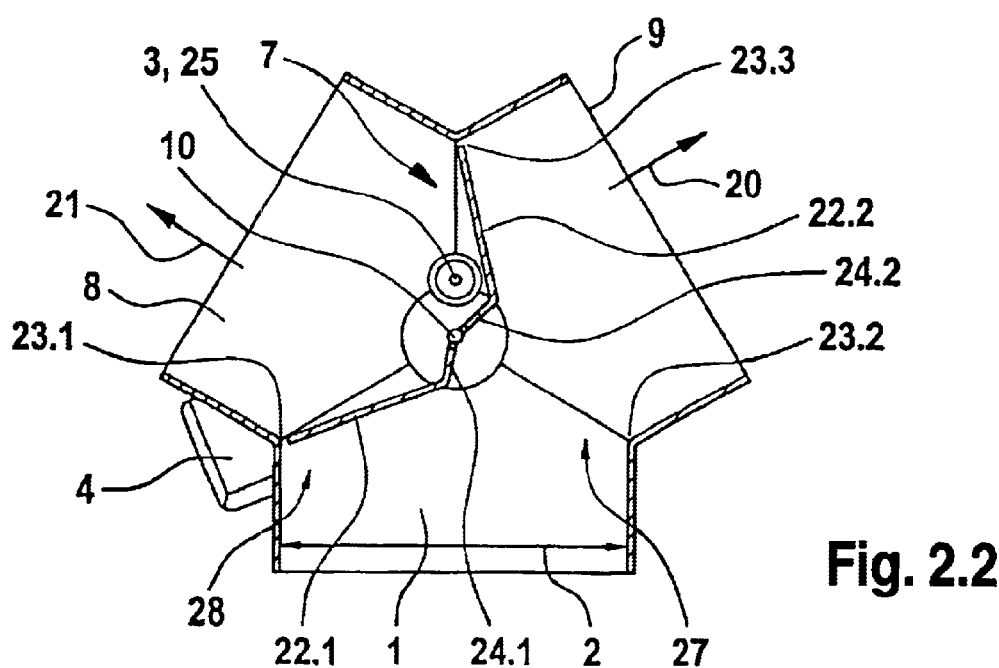
Fig. 2.2

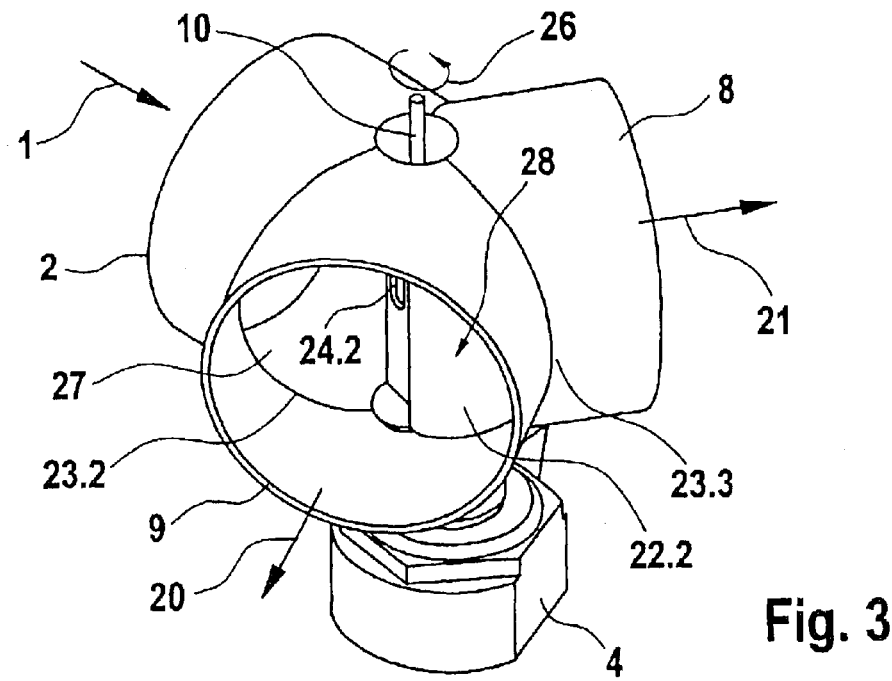
Fig. 3
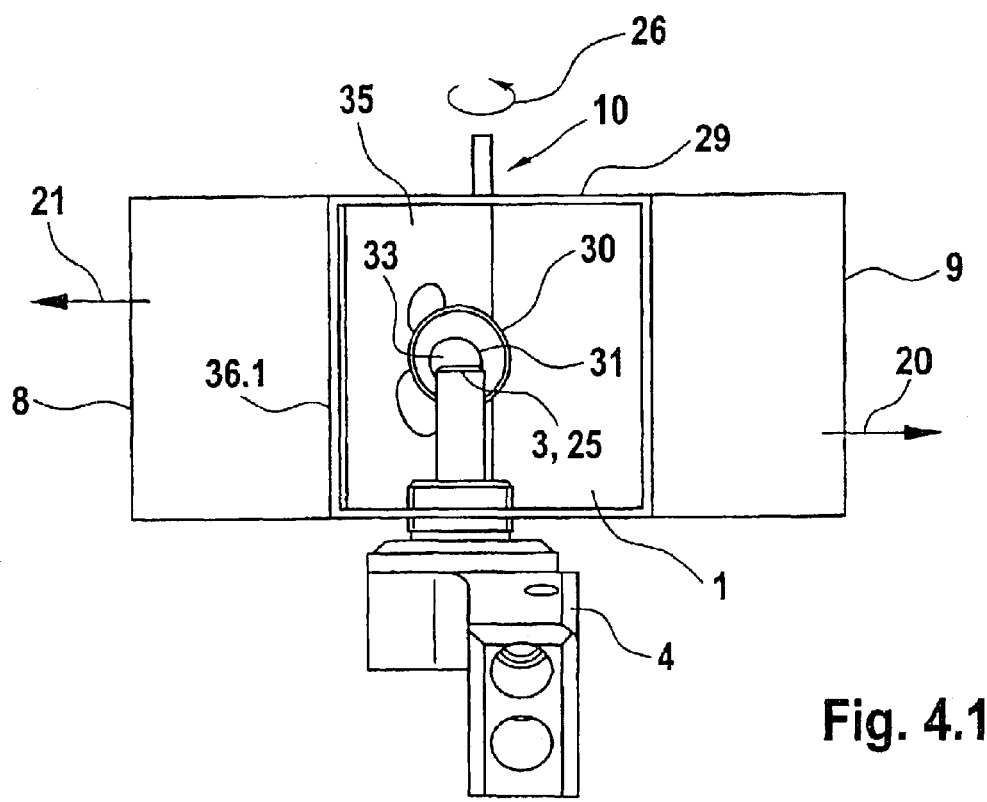
Fig. 4.1

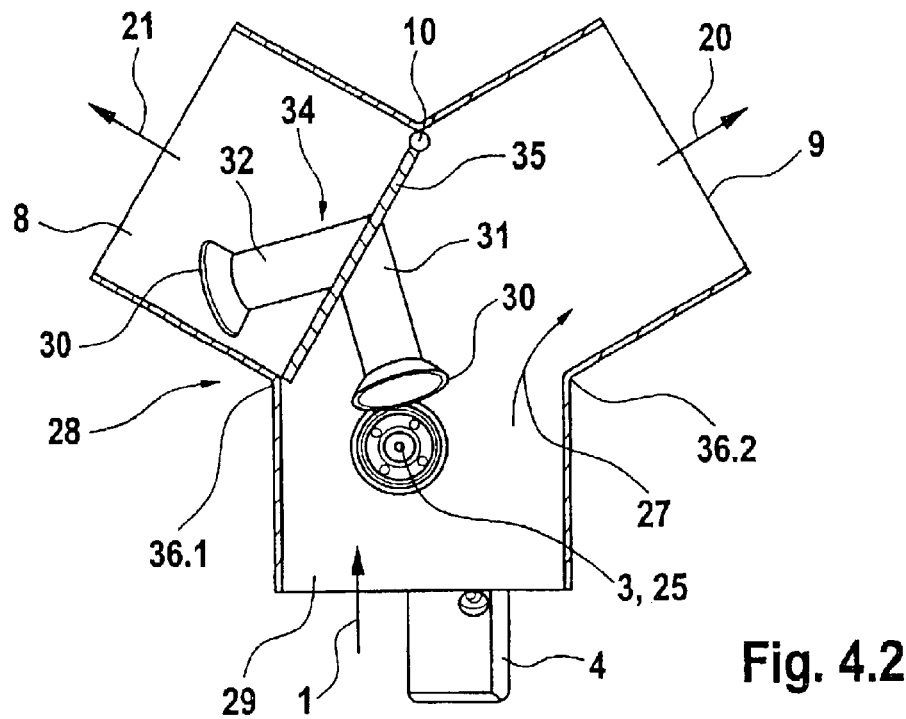
Fig. 4.2
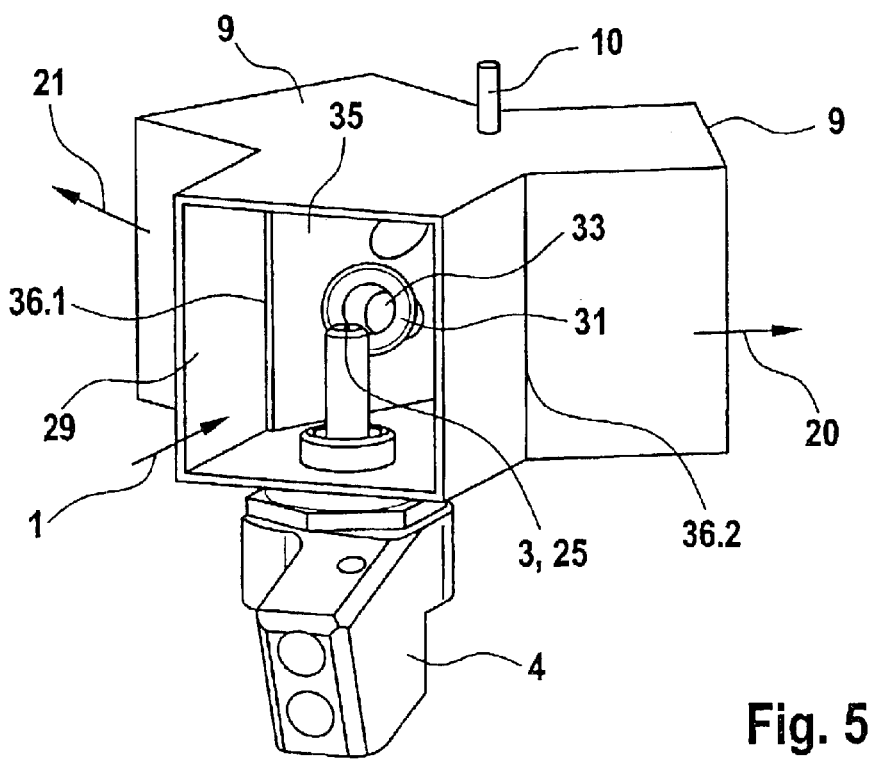
Fig. 5

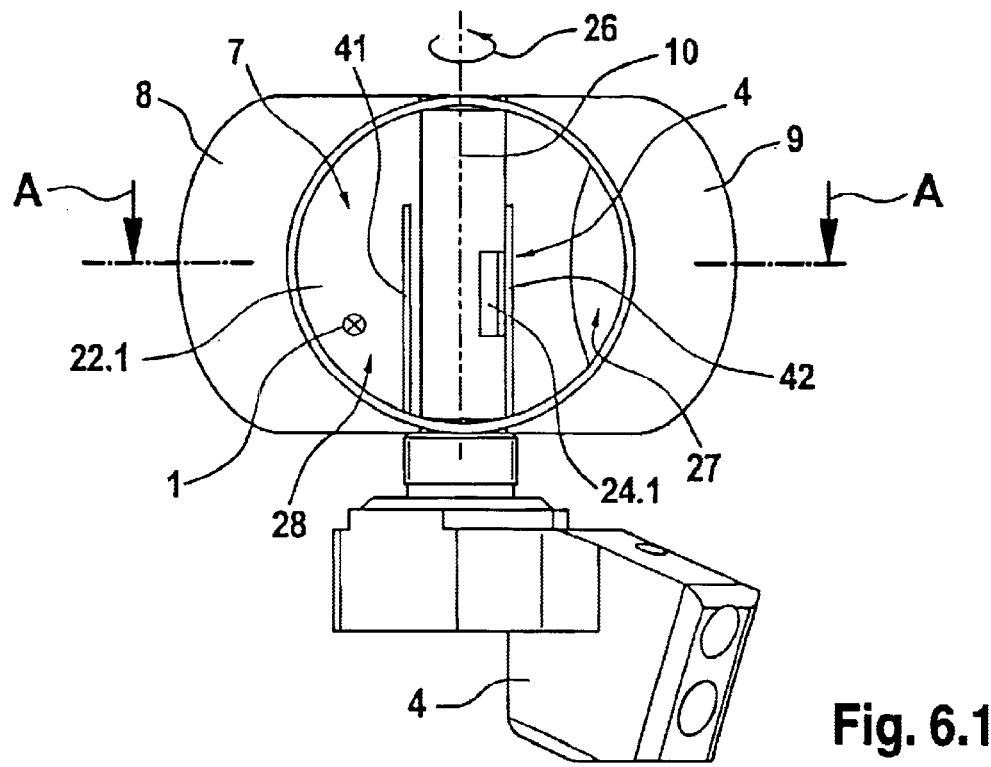
Fig. 6.1
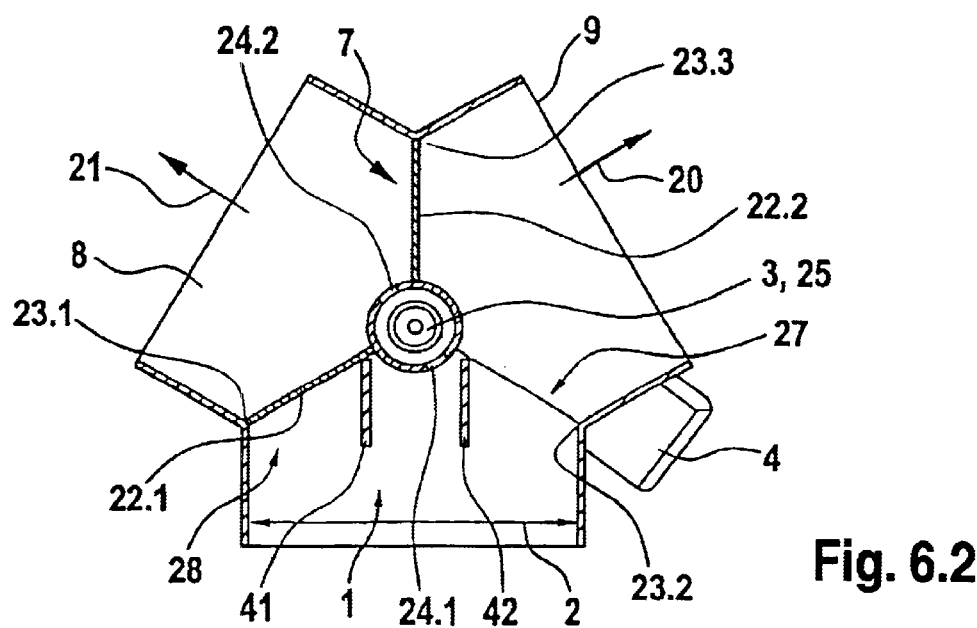
Fig. 6.2

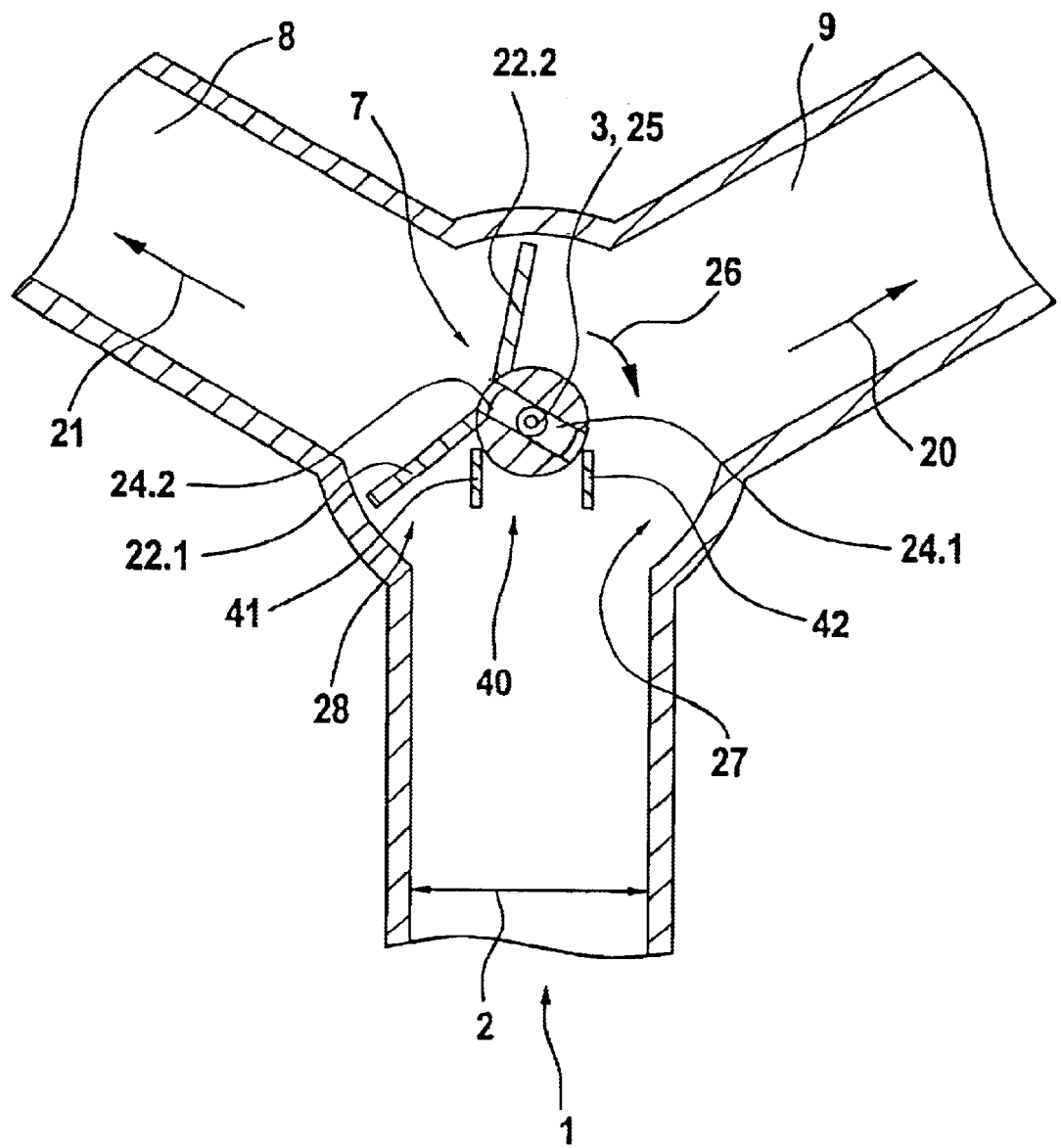
Fig. 6.3

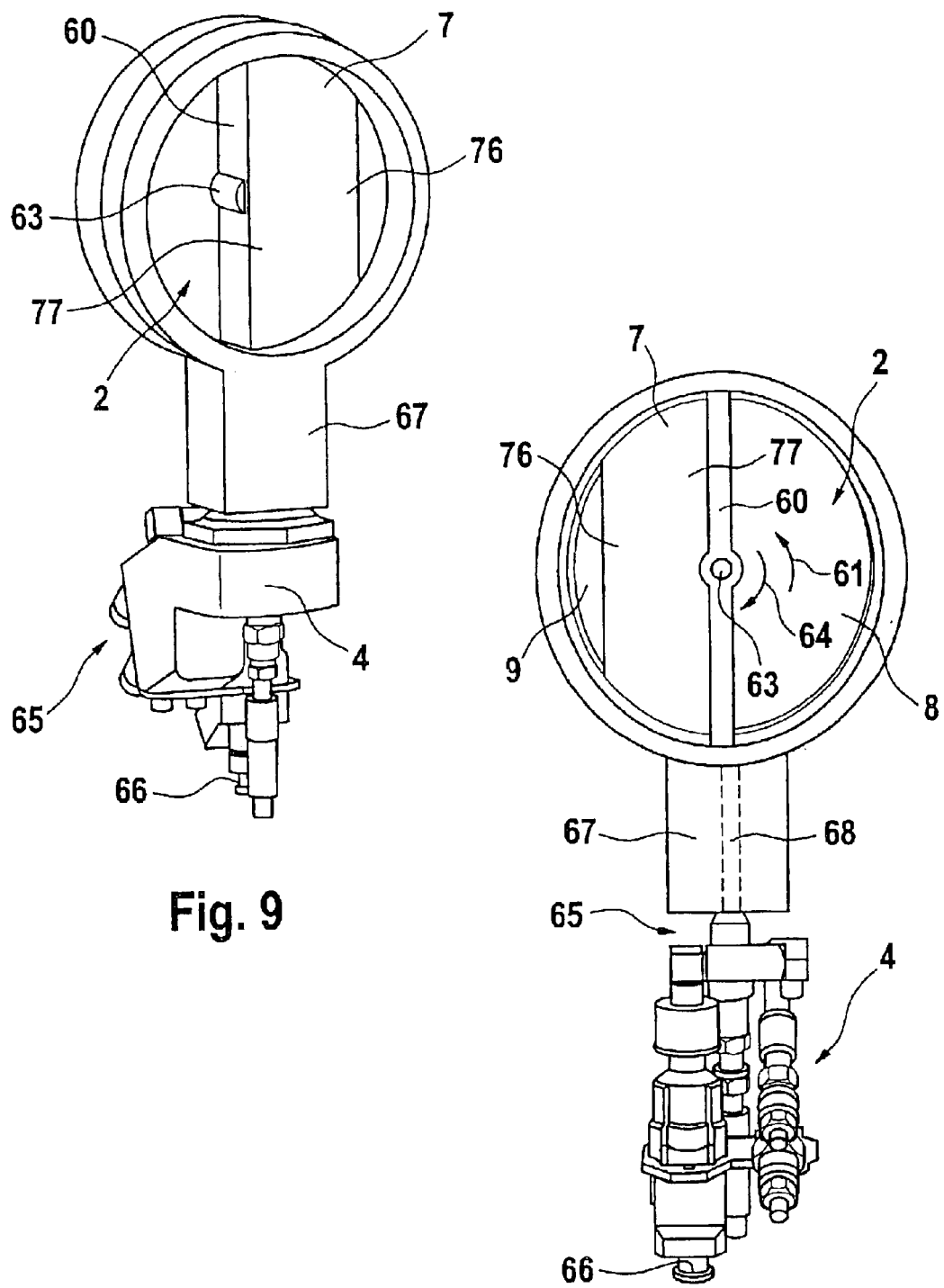

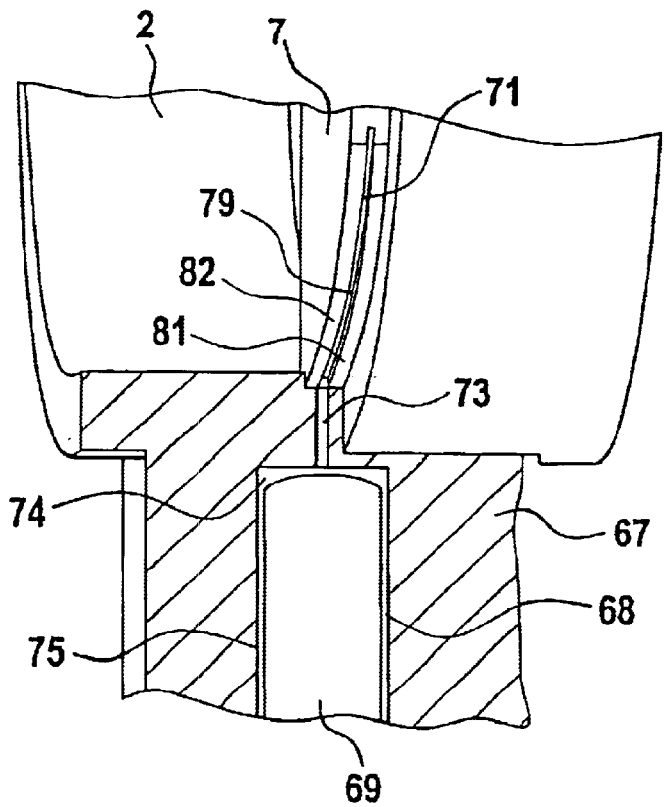
Fig. 12.1
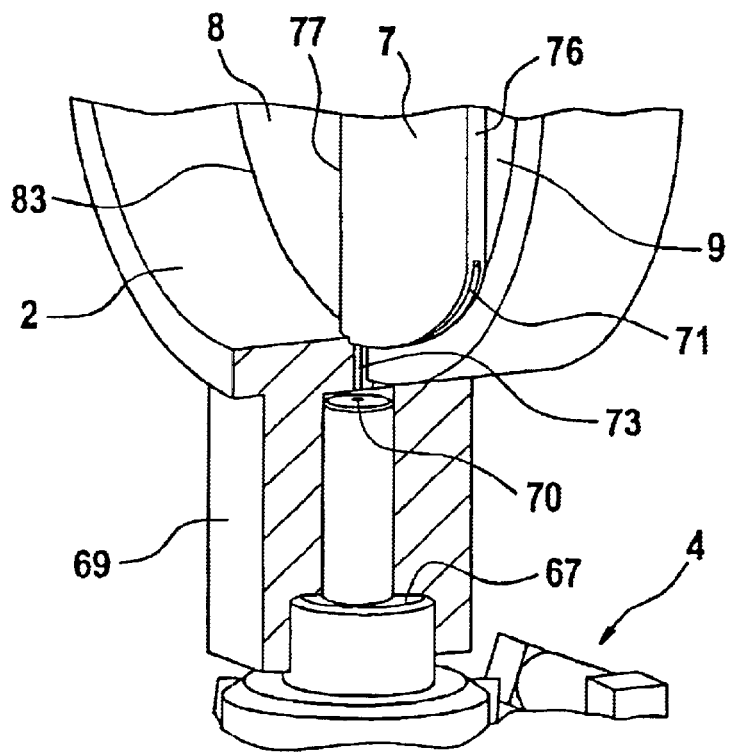
Fig. 12.2

CONTROL ELEMENT FOR THE SIMULTANEOUS CONTROL OF GASEOUS STREAMS

CROSS-REFERENCE TO RELATED APPLICATIONS

This application is a 35 USC 371 application of PCT/DE 02/00952, filed on Mar. 15, 2002.

BACKGROUND OF THE INVENTION

1. Field of the Invention

The demands made of modern internal combustion engines, whether they are externally ignited mixture-compressing or air-compressing engines, in terms of exhaust emissions are becoming more and more stringent. For the European IV standard expected for 2005, in air-compressing internal combustion engines, the use of particle filters is being discussed. They are intended to remove particles, emitted by the Diesel engine, from the exhaust gas stream. CO and HC can be combusted for the most part using oxidation-type catalytic converters. The reduction of $NO_x$, which moreover occurs in externally ignited gasoline direct-injected Otto engines as well, proves difficult.

2. Prior Art

In air-compressing internal combustion engines, the pollutants, that is, CO and HC, are for most part combusted with an oxidation-type catalytic converter downstream of the engine. What proves most difficult is the reduction of $NO_x$. Only by adding a reducing agent to the exhaust gas flow can the $NO_x$ reduction be achieved in a downstream catalytic converter.

The provision of an oxidation catalytic converter downstream in a Diesel engine causes a marked reduction in the emissions of carbon monoxide and hydrocarbons. Since hydrocarbon emissions contribute to particle emissions, they too can be reduced to a limited extent by the catalytic converter. The use of low-sulfur fuel ($\leq 0.001\%$ sulfur (<10 ppm), as of 2005) assures durable effectiveness of the catalytic converter.

At present, the highest $NO_x$ conversion rates are achieved by means of the SCR (selective catalytic reduction) method. In it, a reducing agent is sprayed into the multi-part catalytic converter via a metering system as a function of a performance graph. The reducing agent used most often at present is a urea-water solution. In the hydrolysis part, the actual reducing agent, ammonia, is formed from the solution. In the SCR part, the reduction of $NO_x$ then takes place. The catalytic converter system is as a rule completed by an oxidation part, which oxidizes the uncombusted pollutants, that is, CO and HC. Instead of a urea-water solution as a reducing agent, Diesel fuel can also be used as a reducing agent.

In another variant embodiment (CRT system), the pollutants, that is, CO, HC and $NO_x$, are first oxidized in an oxidation catalytic converter, using a continuously regenerating particle filter system. The $NO_2$ formed by the oxidation then bonds in the downstream soot filter with the carbon C in the particles deposited there and combusts it continuously to form $CO_2$. The $NO_2$ is thus further reduced to NO. If a complete $NO_x$ reduction is desired, it would have to be performed subsequently on the basis of the SCR method—as described above. This system avoids temperature peaks in the soot filter and thus lengthens its service life. To assure optimal, durably effective reduction, it is necessary to operate the engine with sulfur-free Diesel fuel ($\leq 0.001\%$ sulfur), also known as city Diesel.

In Otto engines currently in development, which operate on that principle of direct gasoline injection, $NO_x$ components in the very lean exhaust gas that occur in combustion cannot be reduced by a three-way catalytic converter. By recirculating exhaust gas at a high exhaust gas recirculation rate, a reduction in the $NO_x$ component of the exhaust gas of about 70% is achieved. If exhaust gas regulations are to be met, an additional posttreatment of the $NO_x$ emissions cannot be avoided. For reducing this component of the exhaust gas, the $NO_x$ storage-type catalytic converter offers the greatest potential. In terms of measures taken in the engine to vary the exhaust gas composition, in terms of $NO_x$ emissions, it has proven very effective to achieve the lowering in the peak combustion temperature through the exhaust gas that is returned to the combustion chamber again. Since the $NO_x$ development increases disproportionately with the combustion temperature, exhaust gas recirculation, as a provision to reduce temperature, is a highly effective method of $NO_x$ reduction. By further optimizing the exhaust gas recirculation rates, a reduction in fuel consumption can also be attained. The exhaust gas recirculation can be achieved by way of internal exhaust gas recirculation by means of suitable valve overlap, or by external exhaust gas recirculation through suitably controlled exhaust gas recirculation valves.

SUMMARY OF THE INVENTION

With the embodiment according to the invention, a gas flow entering at a branching point can be divided into two split flows at a determinable volumetric flow ratio $V_{Gas}$, and simultaneously a flow to be metered of a further medium, for instance for posttreatment of exhaust gases from an air-compressing internal combustion engine or a mixture-compressing internal combustion engine with externally supplied ignition, can be allocated at a different ratio $V_{DOS}$ to the two aforementioned split flows. With this embodiment, in a double-pass system, it is possible to dispense with a second metering system.

Arrangements for exhaust gas treatments of the kind used in internal combustion engines that are provided with storage catalytic converters require regeneration of the storage catalytic converters at certain time intervals that depend on a plurality of parameters. In one arrangement for exhaust gas treatment, one storage catalytic converter has the task of catalyzing the main flow of the exhaust gas, while the other catalytic converter, subjected to only a split flow of the exhaust gas, has a medium such as a reducing agent that flows 100% through it. Advantageously, the split flow of the exhaust gas that is delivered to the particular storage catalytic converter that is to be regenerated, can serve as a carrier medium for the reducing agent used. If the introduction point of the further medium flow, for instance of reducing agent, to be metered is selected such that the introduction point is located in the vicinity of the branching point, that is, in the vicinity of the control element of the entering gas flow that is to be divided, then it is possible to prevent the entry of the further medium to be metered, such as a reducing agent, into the main flow of the outflowing gaseous medium, such as exhaust gas.

Besides a control element, embodied with two vanes and with through openings for one split flow of the entering gas flow, that is, to furnish a carrier medium for the further medium, such as a reducing agent, to be metered, the control element can also be embodied as a flap pivotably connected on one end to a circular or rectangular flow conduit. This closing face of a control element of this kind can be provided with tube segments that allow a passage of the lesser split flow of the emerging gas flow; in this variant embodiment of the concept on which the invention is based, the infeed point for the medium to be metered can be disposed immediately upstream of the control element pivotably connected on one end. Also in this variant embodiment, the medium to be delivered can be introduced approximately centrally into the flow conduit, above the bottom face or below the top face, so that no friction losses can occur at the wall of the flow conduit.

With the control element designed according to the invention, an entering gas flow can be adjusted into two outlet-end split flows, depending on the position of the control element in the flow conduit; on the other hand, by the disposition of perforations configured in windowlike fashion in the faces of the control element, or the provision of tubular portions therein, the passage of a medium to be metered through the face of the control element upon infeeding of the medium to be metered, such as a reducing agent, for regenerating storage catalytic converters upstream and downstream of the control element is assured. The control element proposed according to the invention for simultaneously controlling gas flows can be used especially advantageously in exhaust gas treatment systems, if a particle filter with an upstream oxidation catalytic converter is disposed in each of the branches. This arrangement, also known as a "catalytic burner", serves to heat up the exhaust gas for regeneration of the loaded particle filter by burning off soot. It has proved especially advantageous to perform a regeneration in the split flow. In another possible use of the apparatus proposed according to the invention, a variant use can comprise one NO reservoir and one particle filter in both branches of a double-pass exhaust gas posttreatment system.

BRIEF DESCRIPTION OF THE DRAWINGS

The invention is described in further detail below in conjunction with the drawings, in which:

FIG. 2.1, the front view of a pivotable control element received at a branching point;

FIG. 2.2, a cross section through the arrangement of FIG. 2.1;

FIG. 3, a perspective view of the branching point;

FIG. 4.1, a further variant embodiment of a branching point, with a funnel element integrated into a pivotable face;

FIG. 4.2, a cross section through the variant embodiment shown in FIG. 4.1, and

FIG. 5, the variant embodiment of FIG. 4.1 in a perspective top view;

FIG. 6.1, a further variant embodiment of a branching point, with a metering device integrated into a hollow shaft;

FIG. 6.2, a cross section through the arrangement of FIG. 6.1, and

FIG. 6.3, a schematic top view on an arrangement shown in FIG. 6.1;

FIG. 9, a front view of the variant of the control element shown in FIG. 8;

FIG. 10, a back view of the variant embodiment of FIG. 8;

FIG. 12.1, an illustration of details of the delivery of metering agent; and

FIG. 12.2, an illustration of details of the delivery of metering agent.

DESCRIPTION OF THE EMBODIMENTS

Figure 1:
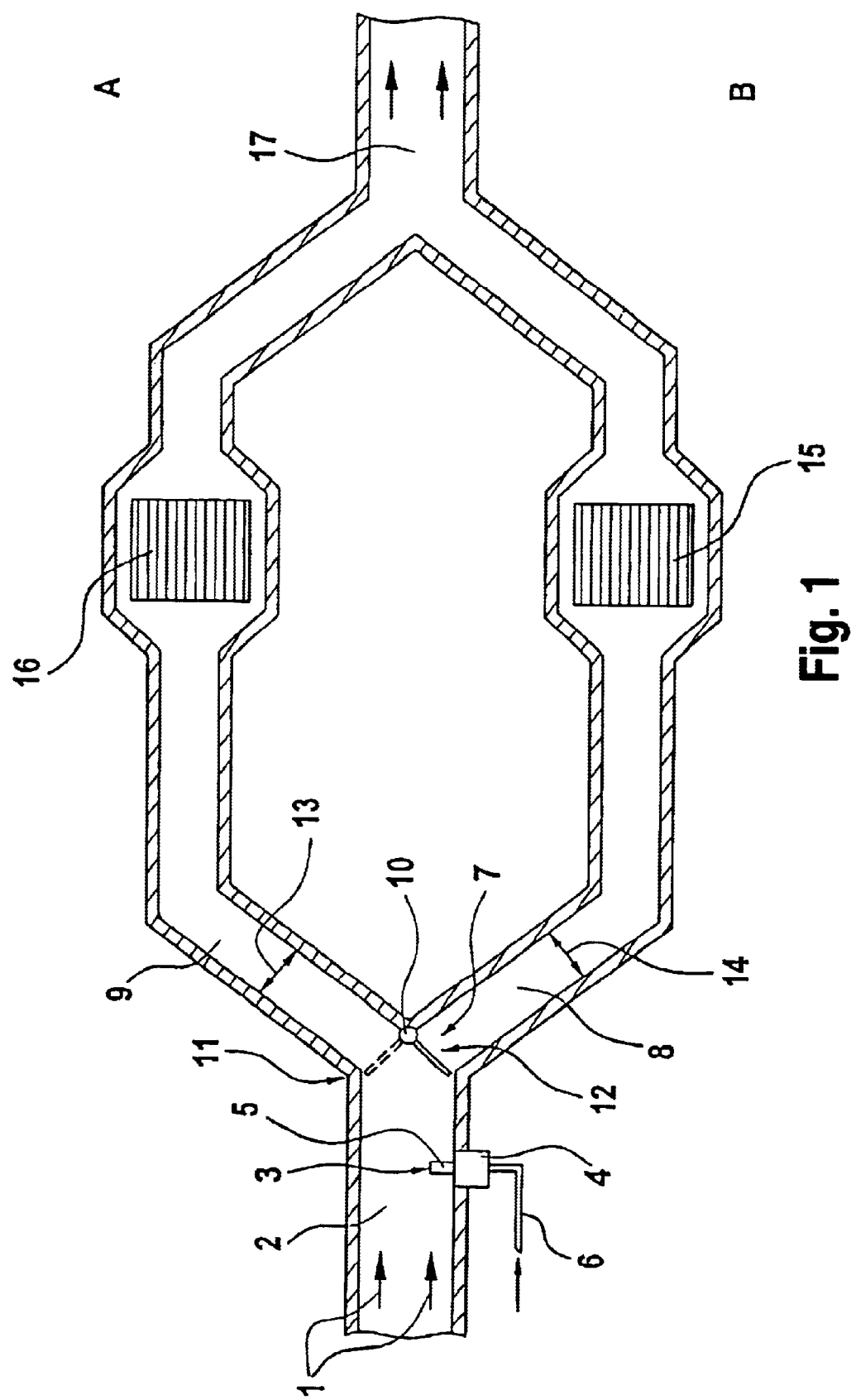
FIG. 1, the entire arrangement for treating a flowing medium, such as a gas flow.

The illustration in FIG. 1 shows the entire arrangement for treating a flowing medium, such as a gas flow.

The apparatus proposed according to the invention for dividing a gas flow to be treated will be described in further detail below in terms of an exhaust gas treatment system, used as an example, of the kind used in internal combustion engines.

Reference numeral 1 indicates an entering gas flow, for instance an exhaust gas flow to be treated from a mixture-compressing internal combustion engine with externally supplied ignition, or from an air-compressing internal combustion engine, that is, a Diesel engine. The entering gas flow flows through the free flow cross section 2 of a line system. In one wall of the line system, either on the side or at the bottom in the bottom region or in the top region of the free flow cross section 2, an infeed point 3 is provided for a medium to be metered into the gas flow to be treated. In the view of FIG. 1, the infeed point 3 is embodied as finger-shaped, where via an opening a medium to be metered is introduced from a metering device into the free flow cross section. The metering device 4, shown here only schematically, enters into communication via a supply line 6 with a reservoir where a large supply of the medium to be metered is held.

At a branching point, in which the free flow cross section 2 divides into one branch A, identified by reference numeral 9, and another branch B, identified by reference numeral 8, a control element 7 is received on a shaft 10. The control element 7—shown in the view of FIG. 1 simply as a flap for the sake of simplicity—can be pivoted back and forth between a control position A, 11, and a control position B, 12. The control motion of the control element 7 about its shaft 10 is effected by means of a control drive, not shown in detail here.

After passing through the control element 7, which is adjustable between the control positions A and B, one split flow of the entering gas flow 1 enters the branch B, reference numeral 8, and flows through its flow cross section 14 in the direction of a storage catalytic converter 15 received in the exhaust gas treatment arrangement.

The main flow of the entering gas flow 1 to be treated, as shown in FIG. 1, passes through branch A, represented by reference numeral 9, and flows through its free flow cross section 13 in the direction of a further storage catalytic converter 15 received in the branch 9. At a union 17, the various split flows passing through the respective branches A—reference numeral 8—and B—reference numeral 9—unite again and leave the exhaust gas treatment arrangement, optionally via a terminal muffler, not shown in detail here, of a motor vehicle.

From FIG. 2.1, the front view of an adjustable control element received at a branching point can be seen in more detail.

As shown in FIG. 2.1, the entering gas flow 1 flows through the free flow cross section 2 of a flow conduit, which here is configured in circular form. The control element 7 received at the branching point and movable about the shaft 10 is provided, in the variant embodiment of FIG. 2.1, with two face portions 22.1 and 22.2, received symmetrically to the shaft 10. In accordance with the control motion 26 of the control element 7 for the entering gas flow 1 to be treated, the volumetric flow ratio $V_{Gas}$, at which the entering gas flow is divided to the respective branches 8 and 9, can be determined. The control element 7 is adjustable about the shaft 10 in both directions; the control motion is introduced into the shaft 10, which here stands vertically, via a drive mechanism not shown in further detail. As shown in FIG. 2.1, the first face portion 22.1 of the control element 7 has rotated into its second position 28, while the second face portion 22 of the control element 7, which is visible only partly in the view of FIG. 2.1, uncovers the flow cross section of the branch 9 or in other words has rotated into its first or open position 27. In the position of the first face portion 22.1 and the second face portion 22.2 of the control element 7 that is adjustable about its shaft 10, the main flow of the entering gas flow to be treated flows through the branch point shown in FIG. 2.1 into the branch 9.

FIG. 2.2 shows a cross section through the arrangement of FIG. 2.1 in greater detail.

The first face portion 22.1 of the control element 7 that is adjustable about its shaft 10 is positioned at a bearing edge 23.1 of the boundary of the flow conduit. In the position shown in FIG. 2.2, the second face portion 22.2 of the control element 7 that is adjustable about its shaft 10 is positioned at a further bearing edge 23.3 of the wall defining the flow conduit.

Because of the first face portion 22.1 and the second face portion 22.2 of the control element, which are both configured in vanelike fashion, it is not possible for a relatively large split flow of the gas flow 1 entering via the flow cross section 2 to enter the branch 8. The split flow entering the branch 8 is determined by the size of window-like openings 24.1 and 24.2 in the first face portion 22.1 and in the second face portion 22.2, respectively. Through these openings, a split flow comprising about 10% of the entering gas flow 1 to be treated is capable of entering the branch 8. On flowing through the window-like openings 24.1 and 24.2 of the control element, the partial flow 21 entrains the medium 5 to be metered in out of the infeed point 3 and 25, respectively, and prevents it from entering the main flow 20 of the entering gas flow 1 to be treated, which main flow is passing through the free flow cross section between the shaft 10 and a bearing edge 23.2.

In the position of the control element 7 shown in FIG. 2.2, viewed together with the arrangement for treating exhaust gas as shown in FIG. 1, the emerging partial flow 21 would serve as a carrier medium for the medium 5 to be metered in downstream of the control element 7, which medium enters the flow conduit at the bottom at the infeed point 3 or 25 as applicable and is entrained by the gas entering via the openings 24.1 and 24.2, respectively. The storage catalytic converter 15 located in the branch 8 as shown in FIG. 1 would be regenerated by the medium 5 to be metered in. The medium 5 to be metered in can be a reducing agent, such as urea-water solution. In the hydrolysis part of the storage catalytic converter 15, regeneration would be accomplished by the medium 5 to be metered in. The medium 5 to be metered in is preferably evaporated or atomized hydrocarbons, such as Diesel fuel or gasoline.

The medium to be metered in may also be a reducing agent, such as a urea-water solution.

The emerging main flow 20 of the entering gas flow 1 to be treated conversely passes through the branch 9 and flows through the further storage catalytic converter 16, received in the branch 9 as shown in FIG. 1, along with exhaust gas which is loaded for instance with $NO_x$. In this position of the control element 7, the storage catalytic converter 15 received in the branch 8 as shown in FIG. 1 would be regenerated, which is accomplished by the medium 5 to be metered in, such as fuel vapor or a fuel spray as a reducing agent, while the storage catalytic converter 16 received in the branch 9 cleans the emerging main flow 20 of the entering gas flow 1 to be treated.

The two split flows 20 and 21 are united, as shown in FIG. 1, at a union 17 before they can be supplied jointly to a terminal muffler of an exhaust gas system of an internal combustion engine or flow into the open air.

As shown in FIG. 2.2, the metering device 4, by way of which the infeed point 3 and 25 is supplied with the medium 5 to be metered in, is received below the bottom of the flow cross section 2. The branch 9, which in the view of FIG. 2.2 has the emerging main flow 20 of the entering gas flow 1 to be treated flowing through it and is capable, thanks to the first position 27 of the control element 7, of passing through it to an extent of about 90%, while the remaining emerging partial flow 21 flows to an extent of about 10% through the window-like openings 24.1 and 24.2 into the vanelike face portions 22.1 and 22.2 of the control element 7.

FIG. 3 shows a view of the branching point in perspective.

From this view, it can be seen that the metering device 4, by way of which the medium 5 to be metered enters the flow conduit is disposed below the branching point in FIG. 3. In this view, the shaft 10 that pierces the wall of the flow conduit can be seen, and a control motion 26 can be imposed on it by a control drive, not shown in further detail here. Because of the first position 27 of the control element 7, the entering gas flow 1 to be treated, which passes through the flow cross section 2, is divided up in such a way that the emerging main gas flow 20 enters the branch 9 with a volumetric flow proportion of 90%, while the remaining partial flow 21, emerging through the openings 24.1 and 24.2 into the branch 8, makes up about 10% of the entering gas flow 1 to be treated. The volumetric flow ratio $V_{Gas}$ of the split flows 20, 21 relative to one another can be varied by means of the shaft 10 relative to the bearing edges 23.2 and 23.3, but it Is always assured that the medium 5 to be metered is always delivered to the branch 8 or 9 in which the respective storage catalytic converter 15 or 16 that is to be regenerated is received.

From the view in FIG. 4.1, a further variant embodiment of a branching point can be seen in further detail, with tubular portions that are integrated into a pivotable face.

Analogously to the views in FIGS. 2.1, 2.2 and 3, a metering device is received on a rectangular flow conduit, below the flow conduit. Via the metering device 4, the medium 5 to be metered is delivered to an infeed point 3 or 25 configured in fingerlike form.

The entering gas flow 1 to be treated enters the rectangular cross section 29 of the flow conduit and flows past the fingerlike infeed point 3 or 25 for the medium 5 to be metered. As shown in FIG. 4.1, downstream of the infeed point 3 or 25 for the medium to be metered, which point protrudes in fingerlike form into the rectangular flow cross section 29, is a funnel element 30, which Is embodied on a tubular portion 31 secured to a flap face 35. The tubular portion 31 uncovers a flow cross section 33, through which a partial flow 21 of the gas flow 1 to be treated, which gas flow is entering the rectangular cross section 29, enters and flows out into the branch 8. In the view of FIG. 4.1, the branch 8 is essentially closed by the edge 36.1, moved in the second position 28, of the flap face 35 of the control element 7. Only through the free flow cross section 33 of the tubular portion 31 can a partial flow 21 flow into the branch 8.

By comparison, the branch 9 is uncovered by the flap face 35 of the control element 7, so that the emerging main gas flow, which is about 90% of the entering gas flow 1 to be treated, can pass through the branch 9.

From the view in FIG. 4.2, a cross section through the variant embodiment of what is shown in FIG. 4.1 can be seen in greater detail.

In the view in FIG. 4.2, the control element 7, embodied as a flap face 35 pivotably connected on one end, is shown in cross section and, in its second position 28, rests on a bearing edge 36.1 of the flow conduit embodied in the rectangular flow cross section 29.

In the variant embodiment of FIGS. 4.1 and 4.2, tubular portions 31 and 32, respectively, are secured to both sides of the flap face 35 that is pivotably connected on one end. The tubular portions, on their ends remote from the flap face 35, each have funnel-like inlet elements 30. From the view in FIG. 4.2, it can be seen that the tubular portions 31 and 32 are received on the flap face 35 in an angular disposition 34 relative to one another. From the top view, shown in section, of FIG. 4.2 it can be seen that the infeed point 3 and 25 of the medium 5 to be metered in is located immediately upstream of the inlet funnel 30 of the tubular portion 31.

If the end, opposite the shaft 10, of the flap face 35 were pivoted over, away from the position shown in FIG. 4.2, onto the bearing edge 36.2, then the infeed point 3, 25 for the medium to be metered in would be located upstream of the funnel-like inlet region 30 of the tubular portion 32, which as shown in FIG. 4.2 protrudes into the downstream branch 8, through which the partial flow 21, making up about 10% of the volumetric flow of the entering gas flow 1 to be treated, flows.

As shown in FIG. 4.2, it is assured, as much as possible, that 100% of the medium 5 to be metered passes through the tubular portion 31 and enters from it into the branch 8, while the volumetric flow making up approximately 10%, that is, the emerging partial flow 21, serves as a carrier medium for the reducing agent, such as Diesel fuel or gasoline, that is to be introduced into a storage catalytic converter 15 to be regenerated.

Simultaneously, it is assured that an emerging main flow 20, making up 90% of the entering gas flow 1 to be treated, flows through the branch 9 that as shown in FIG. 1 receives the storage catalytic converter 16, which is loaded with $NO_x$, while the storage catalytic converter 15 received in the branch 8 is undergoing a regeneration phase.

To prevent flow losses, the tubular portions 31 and 32 are received offset from one another on the two sides of the adjustable flap face 35, so that the flow to be metered to the tubular portions 31 and 32 into the branches 8 or 9, comprising the emerging partial flow 21 and the medium 5 to be metered in, enters the branches 8 and 9, respectively, through the flap face 35.

From the illustration in FIG. 5, a variant embodiment of the branching point of FIGS. 4.1 and 4.2 is seen in a perspective top view.

The metering device 4 received below the flow conduit for the entering gas flow 1, embodied here with a rectangular cross section 29, includes a base 37 on which a finger-shaped infeed point 3 or 25 is received. This infeed point is positioned in the free flow cross section 29 of the flow conduit through which the entering gas flow 1 to be treated passes, immediately before the funnel element 30 of the tubular portion 31 through whose free flow cross section 33 an emerging partial flow 21 enters into the branch 8. The flow cross section of the branch 8 is essentially closed by the flap face 35, pivoted against the bearing edge 36.1, of the control element 7, while the branch 9 experiences the flow through it of the emerging main flow 20 (approximately 90%) of the entering gas flow 1 to be treated.

From FIGS. 6.1, 6.2 and 6.3, a further variant of the control element proposed according to the invention for simultaneously controlling gas flows can be seen.

FIG. 6.1 is a front view of a variant embodiment of the invention, with a control element 7 embodied on a hollow shaft. In this variant embodiment, the control element 7 that divides the entering gas flow 1 is embodied with two vanes and includes a first face portion 22.1 and a further, second face portion 22.2, the latter not shown in FIG. 6. The face portions 22.1 and 22.2 are received laterally on a hollow shaft 40 that defines a shaft axis 10. The hollow shaft 40 is actuatable via a triggering unit, in order to execute a control motion 26 about the shaft axis 10. In the illustration in FIG. 6.1, the first face portion 22.1 of the control element 7 is in a second position 2B, while the further, second face portion 22.2, not shown in FIG. 6.1, is pivoted in a first position 27, so that an emerging main flow can flow out via a branch 9. The wall of the hollow shaft 40 is provided with two window-like openings 24.1 and 24.2, so that into the branch 8 in the second position 28 of the first face portion 22.1 control elements 7 an emerging partial flow 21 can enter the branch 8 via the window-like openings 24,1, 24.2 (not shown) of the hollow shaft 40. The infeed point 3 and 25 of the medium 5 to be metered in is received in the interior of the hollow shaft 40. The hollow shaft 40 can be preceded by a first guide baffle 41 and a further, second guide baffle 42 that point toward the entering gas flow 1.

In the illustration in FIG. 6.2, a cross section through the arrangement of FIG. 6.1 can be seen.

The window-like openings 24.1 and 24.2 are mounted, opposite one another, on the wall of the hollow shaft 40. The infeed point 3, 25 for the medium 5 to be metered is visible in the interior of the hollow shaft 40. In the second position 28 of the first face portion 22.1 of the control element 7, the latter rests on a first support 23.1, while the further, second face portion 22.2 of the control element 7 rests with its outer edge on a further bearing face 23.3 at the branching point. Accordingly, the branch 8, which carries away an emerging partial flow 21 of the gas flow 1 entering through the opening cross section 2, is forced to flow through the openings 24.1 and 24.2 in the wall of the hollow shaft 40 and to feed the medium 5, metered at the infeed point 3, 25 in the interior of the hollow shaft 40, into the branch 8.

By comparison, the branch 9, through which an emerging gas flow 20 leaves the branching point is opened completely, so that approximately 90% of the entering gas flow 1 is capable of flowing out via the branch 9. The cross-sectional view in FIG. 6.2 also shows the guide baffles 41 and 42, upstream of the hollow shaft 40 and with a first face portion 22.1 and a further, second face portion 22.2 embodied on them. These baffles make the entering gas flow 1 flowing to the window-like opening 24.1 uniform.

The illustration in FIG. 6.3 is a schematic top view on an arrangement as shown in FIG. 6.1.

In this variant embodiment, a shaft 40 is provided with a conduit which penetrates the shaft cross section and which includes an inlet opening 24.1 and an outlet-end opening 24.2. The infeed point 3 and 25 for the medium 5 to be metered in discharges into the conduit. By means of a triggering unit, not shown and located below the plane of the drawing, a control motion 26 as represented by the arrow shown can be imposed on the shaft 40. Analogously to the view shown in FIG. 6.2, in the position shown for the control element 7, with face portions 22.1 and 22.2 disposed at obtuse angles to one another, there is an associated pair of guide baffles 41 and 42, with which the inflow of the entering gas flow 1 to the inlet-side opening 24.1 of the conduit of the shaft 40 can be made uniform. In the position shown in FIG. 6.2 of the control element 7, the branch 8, through which an emerging partial flow 21 passes, is closed by the face portions 22.1 and 22.2 of the control element 7, while conversely the brand 9, through which an emerging main flow 20 of the entering gas flow 1 can flow out, is opened.

Figure 7:
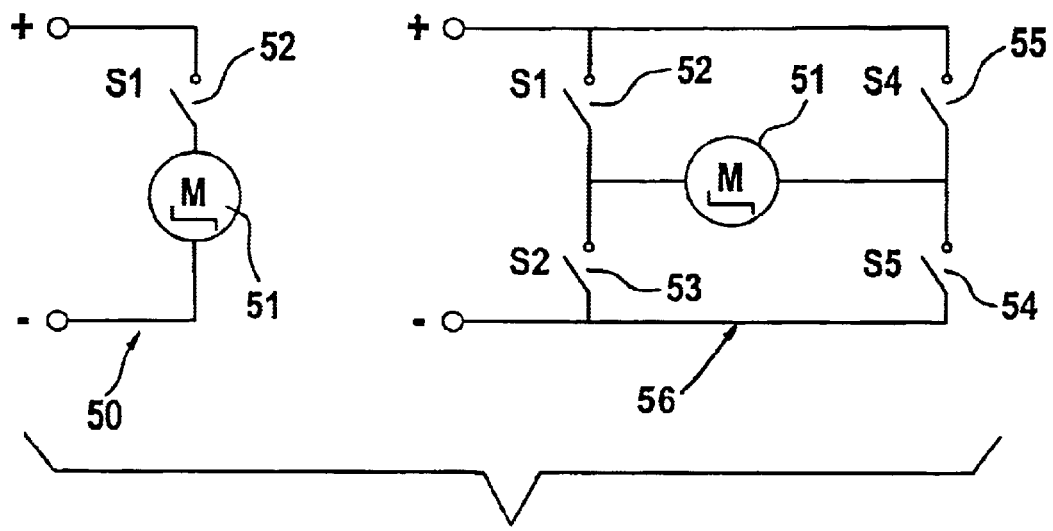
FIG. 7, an illustration of variant circuits for triggering the control element with and without a reversal of the direction of rotation.

FIG. 7 shows variant circuitries for triggering the control element, with and without a reversal of the direction of rotation.

In a further variant embodiment of the concept on which the invention is based, the control element, instead of having a flap configuration, can also be embodied in the form of a disklike element, whose edges have different-sized flow cross sections for the passage of the split flows of the entering gas flow 1. In a version of the control element 7 with a disklike configuration, where the control element is rotatable about the pivot shaft 63 inside a partition 60, a preferably electrical drive 51 is employed, which can be operated either in a variant circuitry 50 without a reversal of the direction of rotation or in a variant circuitry 56 with a reversal of the direction of rotation.

In the variant circuitry 50 without the reversal of the direction of rotation, the electric drive 51 is actuatable, after the actuation of the first switch 52, in a predetermined direction of rotation. By way of example, the electric drive 51 can be embodied as a rotary alternating-pole motor or hybrid stepping motor, since these electric drives, by their construction, maintain whatever position the control element 7 arrived at in the state without current as well. Because of the flow, parallel to the adjusting axis (see FIGS. 9 and 11), approaching a control element 7, which for instance is configured in disklike fashion, fluttering of the control element, or unintentional shifting of it, by the entering gas flow 1 is avoided.

In the variant circuitry 56 with a reversal of the direction of rotation, the electric drive 51 (rotary alternating-pole or hybrid stepping motor) can be operated by four switches 52, 53, 54 and 55 in both directions of rotation. For the counterclockwise motion of the electric drive 51, the fourth switch 55 and the second switch 53 are closed, while the first switch 52 and the third switch 54 are opened. To achieve a clockwise motion of the disklike control element 7, the first switch 52 and the third switch 54 are closed, while the fourth switch 55 and the second switch 53 are opened.

If a flaplike control element 7 is used as the control element 7 for splitting up the entering gas flow to the branch A (reference numeral 9) and the branch B (reference numeral 8) then with the variant circuitry 56 with the reversal of the direction of rotation, its drive unit 51 can be actuated in both directions of rotation 61 and 64. Conversely, if as the control element 7 a disklike form supported on a partition 60 is employed, then it can still be rotated in the same direction of rotation about its pivot shaft 63, to which end the electric motor 51 that drives the control element 7 can be switched as shown in FIG. 7, in the first variant circuitry 50 without a reversal of the direction of rotation. In the variant circuitry 50 without a reversal of the direction of rotation, the end stage that triggers the electric drive 51 can be kept substantially simpler.

Figure 8:
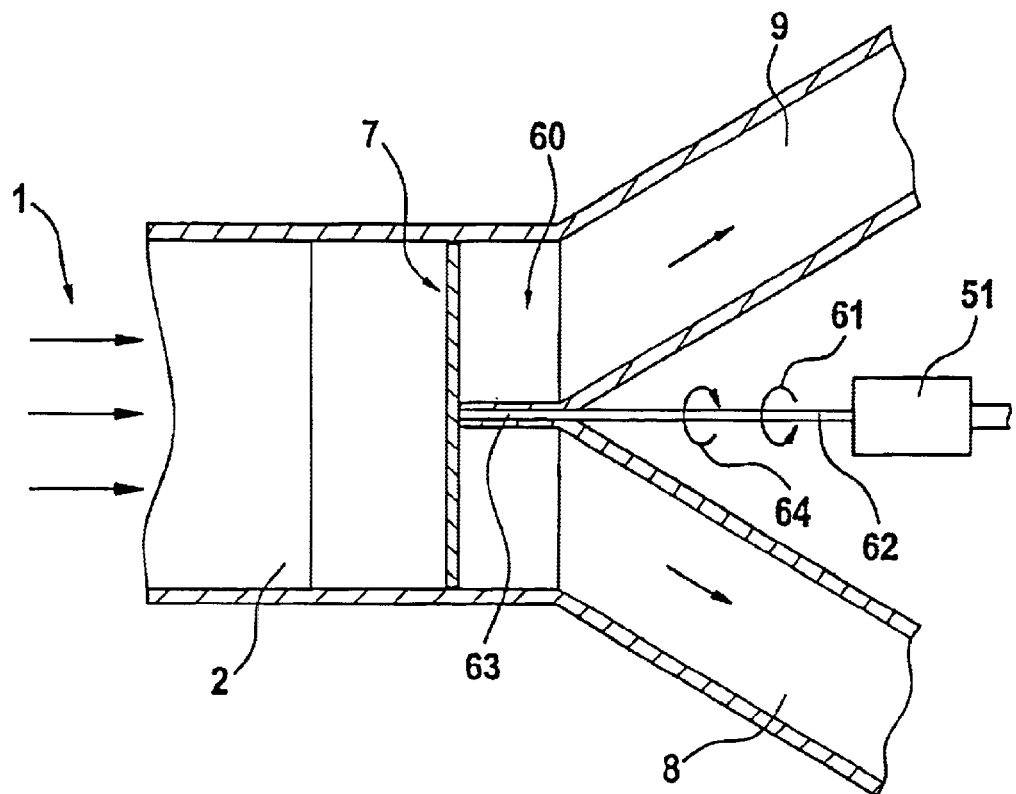
FIG. 8, the top view on a variant embodiment with a control element received rotatably at a partition.

FIG. 8 shows the plan view on a variant embodiment with a control element received rotatably on a partition.

In this schematic illustration of a further variant embodiment of the control element 7, this control element is embodied as disklike or as a disk segment, by way of example. It is exposed directly to the oncoming flow of the entering gas flow 1, which passes through the flow cross section 2. Since the pivot shaft 63 of the control element 7, in the variant embodiment of FIG. 8, extends parallel to the entering gas flow 1, no forces that could cause fluttering or unintentional shifting of the disklike control element 7 shown in FIG. 8 are exerted on the adjusting mechanism. Moreover, as a result of this arrangement, the requisite adjusting force is minimized, so that a corresponding final control element can be made quite small. The pivot shaft 63 of the disklike control element 7 is received in a partition 60, which extends parallel to the entering gas flow 1 in the flow cross section 2. The actuating shaft of the pivot shaft 63, that is, the drive shaft 62 of the electric drive 51, can have a specified first direction of rotation 61 or a second adjusting direction 64 or can rotate in both directions, depending on the selected variant embodiment of the control element 7, whether in disk form or flap form. As the electric drive 51, preferably rotary alternating-pole or hybrid stepping motors are used, since in the state without current they are capable of keeping the control element 7 in whatever position it has approached and holding it counter to any shifting from the flow forces exerted by the entering gas flow 1.

Extending downstream of the control element 7 are a branch A for a first split flow and a further branch B for a second split flow. Depending on the position of the control element 7 relative to its circumferential direction in the flow cross section 2, the entering gas flow 1 is split up to the respective branches A and B at a variously settable ratio.

FIG. 9 shows a front view of the variant of the control element of FIG. 8.

In the front view of this variant embodiment of the embodiment of the invention, the free flow cross section 2 is penetrated by a partition 60, which extends parallel to the flow direction of the entering gas flow 1. A pivot shaft 63 is received in the partition 60, and a control element 7, embodied here in disk form, is rotatable around it. The control element 7 in disk-segmental form has one short side 76 and opposite it one long side 77. Because of the different lengths of edge portions of the control element 7 embodied in the shape of a disk, different flow cross sections for the split flows are defined inside the flow cross section 2. Instead of sides 76 and 77 of different lengths, the control element 7 can also have plane elements with oblong slots in the middle or with partial perforations on the outer surface, making it possible to define different flow cross sections for the split flows. The flow cross section 2 is defined by an inner wall of a housing that is received on a base 67. The base 67 is provided in turn, on its lower end face, with a metering device 4, which by way of example can receive a tube evaporator 65. The feeding to the tube evaporator 65 is effected via a connection 66, at which the metering agent to be metered into the free flow cross section 2 is delivered.

FIG. 10 shows a back view of the variant embodiment schematically shown in FIG. 8.

In this figure, it can be seen that the disklike control element 7, with its short side 76, defines a flow cross section in the branch A for a first split flow. The flow cross section for the second split flow, in the branch B identified by reference numeral 8, is dimensioned as substantially larger than the flow cross section for the first split flow. By means of the electric drive 51, indicated in FIG. 8 but not shown in FIG. 10, the disklike control element 7 can be actuated about its pivot shaft 63 in either first the direction of rotation 61 or the second direction of rotation 64. The base 67, on which the wall that defines the free flow cross section 2 is received, is penetrated by a base bore 68. An evaporator tube 69, not shown in FIG. 10, is contained in the base bore 68 in the base 67. The base 67 is located in the upper region of the metering device 4, and the metering device can include a tube evaporator 65 which is provided, on the side remote from the base 67, with a connection 66 for delivering the metering agent.

Figure 11:
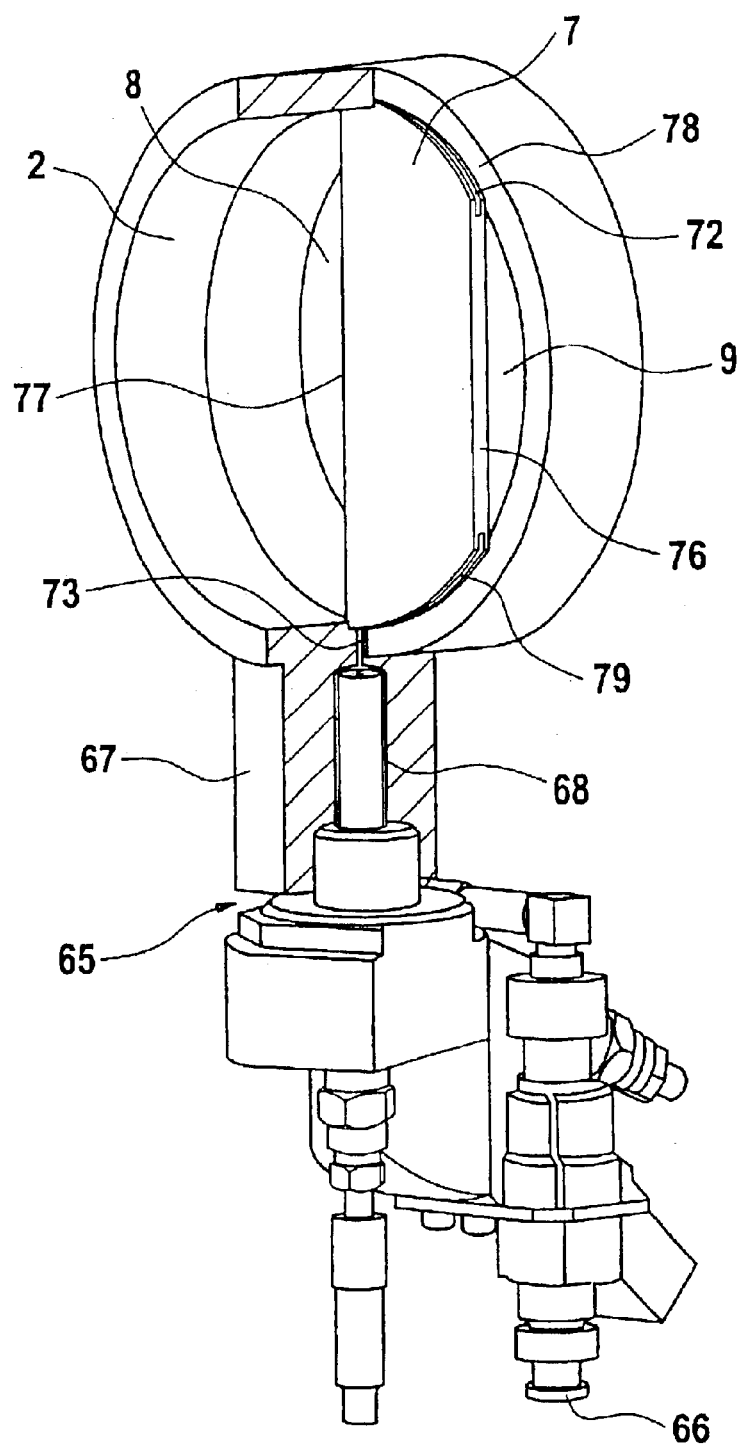
FIG. 11, a fragmentary section through the control element of FIGS. 9 and 10.

FIG. 11 shows a fragmentary section through the variant embodiment of FIGS. 9 and 10. From it, it can be seen that the control element 7 configured in disk form, on its circumferential surface segment that extends between the short side 76 and the long side 77, includes one annular groove segment 72 and 79 each, respectively. The annular groove portion 72 and 79 is defined by a first annular groove wall 81 and a second annular groove wall 82 (shown in FIG. 12.1).

By means of the drive unit 51 shown in FIG. 8, the control element 7 configured in disk form can be rotated in either the first direction of rotation 61 or the second direction of rotation 64, so that in the free flow cross section 2, different flow cross sections for split flows I and II are created.

From the view in FIG. 11, it can also be learned that the upper part of the tube evaporator 65 is received in the base bore 68 of the base 67. Reference numeral 73 indicates a conduit portion, located in the wall that defines the free flow cross section 2. The metering conduit portion 73 shown in FIG. 11 is in communication with the annular grooves 72 and 79 that are provided on the circumferential segments of the control element 7 embodied in disk form.

From FIGS. 12.1 and 12.2, views of details of the delivery of metering agent to the control element 7 can be seen.

The illustration in FIG. 12.1 shows a fragmentary section through the base 67, in whose receiving bore 68 an outlet tube 69 of the tube evaporator 65 is received. The outlet tube and the inner wall of the base bore 68 define an annular gap 75, which in its upper region inside the base 67 changes over into a chamber 74. Beginning at the chamber 74, a metering conduit portion 73 extends through the base 67. The end of the metering conduit portion 73 remote from the chamber 74 is in communication with the annular grooves 79 embodied on the circumferential surface of the control element 7. The metering agent, which is delivered via the tube evaporator 65, is introduced, after emerging from the outlet tube 69 of the tube evaporator 65, via the metering conduit portion 73 into the annular groove 72 or 79, which is milled into the outer circumferential segments of the disklike control element 7. The metering agent flows along the outer circumferential surface of the control element 7 made in disk form, until the gas flow 1 enters whichever conduit portion A or B requires the metering agent. To prevent the metering agent from escaping laterally from the annular groove portions 72 and 79 on the circumference of the control element 7, the control element 7 configured in disk form is guided inside the free flow cross section 2 in the housing in a housing groove 83.

Since the control element 7 made in disk-segmental form is moved about only a pivot shaft 63 extending parallel to the entering gas flow 1, the metering conduit portion 73 and the annular grooves 72 and 79 are always in communication with one another, so that the metering agent, flowing in the metering agent conduit 71, formed by the annular grooves 72, 79 and by the metering conduit portion 73 of the base 67, does not emerge from undesired points within the free flow cross section 2.

The metering agent, after emerging from the outlet tube 69 with the outlet opening 70 in the tube evaporator 65, is preferably transported to the side of the control element 7 of disklike shape that determines the minimal volumetric flow, or in other words to the short side 67 of the disklike control element 7.

From FIG. 12.2, it can be learned that the metering agent emerging at an outlet opening 70 of the outlet tube 69 of the tube evaporator 65 enters the metering conduit portion 73, embodied in the wall of the free flow cross section 2, and from there flows into an annular groove on the circumferential surface of the control element 7. From there, the metering agent flows through the metering agent conduit 71, formed by the annular groove, in the direction of the short side 76 of the control element 7 shaped in the form of a disk and there meets the minimal split flow—in the present case, in the branch 9—and is mixed with the split flow, passing through this reduced flow cross section, of the entering gas flow 1. Reference numeral 83 on the boundary wall of the free flow cross section 2 indicates the housing groove, which makes a sealing guidance of the disklike control element 7 possible upon its rotation about the pivot shaft 63, not shown in FIG. 12.2.

With this variant embodiment of the concept on which the invention is based, the advantage can be attained that the control element 7 can be embodied with a smaller structural size; its shaft 63 is located in the axial direction of the exhaust gas system and thus of the entering gas flow 1. With the variant embodiment presented here, the drive 51 that rotates the control element 7 made in disk form can be integrated between the branches A and B and requires hardly any space of its own. By way of the rotational position of the long and short sides 77 and 76 of the triggering element 7 made in disk form, the minimal volumetric flow for both the branch A and the branch B can be set by rotation of the control element 7 made in disk form. In certain operating states, such as during warmup or emergency operation of the engine, a rotation of the control element 7 by 90° can make an equal flow possible through both branches A and B.

With the embodiments described, by means of a control element 7 which divides an entering gas flow 1, such as an exhaust gas flow from an internal combustion engine, into two split flows 20 and 21 at a certain volumetric flow ratio $V_{Gas}$, it is simultaneously possible to impose a different ratio $V_{DOS}$, compared to the volumetric flow ratio $V_{Gas}$ of the two split flows 20 and 21, upon a flow to be metered in of a medium 5 for exhaust gas posttreatment, such as a reducing agent (for instance, hydrocarbons or a urea-water solution). As a result, in exhaust gas treatment systems associated with internal combustion engines, a second metering device can be avoided.

The foregoing relates to preferred exemplary embodiments of the invention, it being understood that other variants and embodiments thereof are possible within the spirit and scope of the invention, the latter being defined by the appended claims.

List of Reference Numerals

1 Entering gas flow

2 Flow cross section
3 Infeed point
4 Metering device
5 Medium to be metered
6 Supply line
7 Control element
8 Branch B
9 Branch A
10 Shaft
11 Control position A
12 Control position B
13 Flow cross section, branch A
14 Flow cross section, branch B
15 Storage catalytic converter B
16 Storage catalytic converter A
17 Union
20 Emerging main flow (90%)
21 Emerging split flow (10%)
22.1 First face portion
22.2 Second face portion
23.1 First support
23.2 Second support
23.3 Further support
24.1 Opening
24.2 Opening
25 Infeed point
26 Control motion
27 First position
28 Second position
29 Rectangular flow cross section
30 Funnel inlet
31 Tubular portion
32 Further tubular portion
33 Cross section
34 Angled arrangement
35 Flap face
36.1 First bearing edge
36.2 Second bearing edge
40 Hollow shaft
41 First guide baffle
42 Second guide baffle
50 Second variant without reversal of direction of rotation
51 electric drive
52 First switch
53 Second switch
54 Third switch
55 Fourth switch
56 Second variant with reversal of direction of rotation
60 Partition
61 First direction of rotation
62 Drive shaft
63 pivot shaft
64 Second direction of rotation
65 Tube evaporator
66 Metering agent supply connection
67 Base
68 Base bore
69 Tube evaporator outlet tube
70 Outlet opening
71 Metering agent conduit
72 Annular groove
73 Metering conduit portion base
74 Chamber
75 Annular gap
75 Short side
76 Long side
77 Outer circumference of control element
78 Annular groove
79 End of groove
80 First annular groove wall
81 Second annular groove wall
82 Housing groove

We claim:

1. An apparatus for dividing an entering gas flow (11) into two split flows (20,21) each of which flow through one branch (8,9) of a line system, comprising
a control element (7) in the line system which executes a control motion (26) about a shaft (10) between a first position (27) and a second position (28) to continuously divide the entering gas flow (1) between the split flows (20,21),
the control element (7) being adjustable to divide the gas flow (1) at a volumetric flow ratio $V_{Gas}$,
means supplying a metered input of a medium (5) to the line system at an infeed point (3,25)
the infeed point (3,25) being associated with the control element (7) whereby the control element (7) simultaneously allocates the medium (5) to the split flows (20,21) at different ratio $V_{Dos}$.

2. The apparatus of claim 1 wherein the volumetric flow ratio $V_{Gas}$ of the outflowing split flows (20, 21) is variable between a first position (27) and a second position (28) by means of a suitable intermediate position of the control element (7).

3. The apparatus of claim 1 wherein the infeed point (3, 25) of the medium (5) to be metered is received in the bottom region or in the top region of the flow cross section (2, 29).

4. The apparatus of claim 1 wherein the infeed point (3, 25) protrudes in fingerlike fashion into the free flow cross section (2, 29).

5. The apparatus of claim 1 wherein the control element (7) includes vanelike face portions (22.1, 22.2) that are embodied symmetrically to the shaft (10).

6. The apparatus of claim 5 wherein the vanelike face portions (22.1, 22.2) each include window-like openings (24.1, 24.2).

7. The apparatus of claim 5 wherein the vanelike face portions (22.1, 22.2), in the first position (27) or the second position (28), are positioned at bearing edges (23.1, 23.2, 23.3) of the flow cross section (2).

8. The apparatus of claim 1 wherein the control element (7) is embodied as a flap element pivotably connected on one end, whose flap face (35) is received on a wall of the flow cross section (29).

9. The apparatus of claim 8 further comprising tubular portions (31, 32), which are offset from one another in the flap face (35), the tubular portions (31,32) being received on both sides of the flap face (35).

10. The apparatus of claim 9 further comprising funnel-shaped inlets (30) associated with the tubular portions (31, 32), on the ends opposite the flap face (35).

11. The apparatus of claim 8 further comprising the tubular portions (31, 32) are received at an angle to one another on the flap face (35).

12. The apparatus of claim 9 wherein the infeed point (3, 25) of the medium(5) to be metered is located upstream and in front of the tubular portion (31) of the control element (7), which tubular portion is associated with the flow cross section (2) of the entering gas flow (1).

13. The apparatus of claim 1 wherein the control element (7) is embodied on a hollow shaft (40), and wherein interior the infeed point (3, 25) for the medium (5) to be metered is received in the interior of the hollow shaft.

14. The apparatus of claim 13 wherein the wall of the hollow shaft (40) is pierced by window-like openings (24.1, 24.2), and wherein face portions (22.1, 22.2) are received on the hollow shaft (40).

15. The apparatus of claim 5 wherein the face portions (22.1, 22.2) are received at an angled disposition to one another.

16. The apparatus of claim 14 wherein the face portions (22.1, 22.2) are received at an angled disposition to one another.

17. The apparatus of claim 1 wherein the control element (7) comprises a drive unit (51) and wherein, upon failure of the drive unit (51), the control element 7 automatically moves into a middle position between the first position and second position (27, 28), so that the branches (8, 9) downstream of the control element (7) are subjected uniformly to the entering gas flow (1).

18. The apparatus of claim 1 wherein the control element (7) is embodied as disk-segment-shaped and is rotatable in the free flow cross section (2) about a pivot shaft (63) which is located parallel to the flow.

19. The apparatus of claim 18 wherein the disklike control element (7) includes edge portions (76, 77), extending parallel to one another, which define mean cross sections for split flows of the entering gas flow (1).

20. The apparatus of claim 19 wherein the edges (76, 77) opposite one another on the disk-segment-shaped control element (7) are of different edge lengths.

21. The apparatus of claim 1 wherein the control element (7) has openings or partial perforations, configured as oblong slots, in its surface.

22. The apparatus of claim 18 further comprising groove-like metering agent conduits (72, 79) embodied on the outer circumference of the disk-segment-shaped control element (7).

23. The apparatus of claim 22 wherein the disk-segment-shaped control element (7) in the flow cross section (2) is guided in a groove (83), which is embodied on the boundary wall of the flow cross section (2).

24. The apparatus of claim 22 wherein the metering agent conduits (72, 79) of the control element (7) are joined in disk form with a metering conduit portion (73) embodied in the boundary wall of the flow cross section (2).

25. The apparatus of claim 24 wherein the means supplying the metered input of a medium comprises a metering device (4) containing a tube evaporator (65, 69) is associated with the control element (7).

26. The apparatus of claim 17 wherein the control element (7) is embodied as disc-segment-shaped and is rotatable in the free flow cross section (2) about a pivot shaft (63) which is located parallel to the flow, and wherein, the apparatus further comprising drive means actuating the disk-segment-shaped control element (7), the drive means being coupled to the pivot shaft (63) of the control element (7) via a drive shaft (62).

27. The apparatus of claim 26 wherein the control element (7) in disk-segment form is rotatable in a first direction of rotation (61) by means of an electric drive (51) or a pneumatic drive.

28. The apparatus of claim 26 wherein the control element (7) in disk-segment form is rotatable in a second direction of rotation (64) by means of an electric drive (51) or a pneumatic drive.

29. The apparatus of claim 5 wherein the control element (7) is in flap form and is actuatable by means of an electric drive (51) in both a first direction of rotation (61) and the second direction of rotation (64).

30. The use of the apparatus of claim 1 in an assembly for exhaust gas posttreatment of internal combustion engines, in whose branches (8, 9), regeneratable catalytic converters or storage catalytic converters (15, 16) are received.

31. The use of the apparatus of claim 1 in an assembly for exhaust gas posttreatment of internal combustion engines, in whose branches (8, 9), a particle filter with an upstream oxidation catalytic converter is received.

* * * * *